US012711351B2

(12) United States Patent
Jang et al.

(10) Patent No.: US 12,711,351 B2
(45) Date of Patent: Aug. 18, 2026

(54) QUANTIZATION METHOD OF NEURAL NETWORK AND APPARATUS FOR PERFORMING THE SAME

(71) Applicants: Samsung Electronics Co., Ltd., Suwon-si (KR); UNIST (ULSAN NATIONAL INSTITUTE OF SCIENCE AND TECHNOLOGY), Ulsan (KR)

(72) Inventors: Jun-Woo Jang, Suwon-si (KR); Jaewoo Park, Ulsan (KR); Faaiz Asim, Ulsan (KR); Jongeun Lee, Ulsan (KR)

(73) Assignees: Samsung Electronics Co., Ltd., Suwon-si (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 920 days.

(21) Appl. No.: 17/887,216

(22) Filed: Aug. 12, 2022

(65) Prior Publication Data

US 2023/0153571 A1 May 18, 2023

(30) Foreign Application Priority Data

Nov. 12, 2021 (KR) ........................ 10-2021-0155942

(51) Int. Cl.
*G06N 3/04* (2023.01)
*G06N 3/063* (2023.01)

(52) U.S. Cl.
CPC ............... *G06N 3/04* (2013.01); *G06N 3/063* (2013.01)

(58) Field of Classification Search
CPC ........ G06N 3/04; G06N 3/0495; G06N 3/063; G06N 3/08
See application file for complete search history.

(56) References Cited

U.S. PATENT DOCUMENTS

2022/0044109 A1* 2/2022 Donnelly ................ G06N 3/04

FOREIGN PATENT DOCUMENTS

| | | | |
|---|---|---|---|
| EP | 3 640 858 | A1 | 4/2020 |
| EP | 3 772 022 | A1 | 2/2021 |
| KR | 10-2020-0139071 | A | 12/2020 |
| KR | 10-2021-0053160 | A | 5/2021 |
| WO | WO 2020/248424 | A1 | 12/2020 |

OTHER PUBLICATIONS

Pham et al., "Training Multi-Bit Quantized and Binarized Networks with a Learnable Symmetric Quantizer", Mar. 22, 2021, IEEE Access, pp. 47194-47203. (Year: 2021).*

(Continued)

*Primary Examiner* — Brent Johnston Hoover
(74) *Attorney, Agent, or Firm* — NSIP Law

(57) ABSTRACT

A quantization method of a neural network, and an apparatus for performing the quantization method are provided. The quantization method includes obtaining parameters of the neural network, quantizing the parameters using a quantization scheme in which at least one positive quantization level and at least one negative quantization level symmetric to each other by excluding zero from quantization levels, and outputting the quantized parameters.

19 Claims, 7 Drawing Sheets

(56) References Cited

OTHER PUBLICATIONS

Jung et al., "Learning to Quantize Deep Networks by Optimizing Quantization Intervals with Task Loss", Nov. 23, 2018, arXiv: 1808.05779v3, pp. 1-10/ (Year: 2018).*

Hubara et al., "Quantized Neural Networks: Training Neural Networks with Low Precision Weights and Activations", Sep. 22, 2016, arXiv:1609.07061v1, pp. 1-29. (Year: 2016).*

Asim, et al. "CSQ: Centered Symmetric Quantization for Extremely Low Bit Neural Networks." *ICLR*, (Sep. 28, 2021). pp. 1-18.

Esser, et al. "Learned step size quantization." arXiv preprint arXiv:1902.08153 v3. (May 7, 2019). pp. 1-12.

Bhalgat, et al. "Lsq+: Improving low-bit quantization through learnable offsets and better initialization." Proceedings of the IEEE/CVF Conference on Computer Vision and Pattern Recognition Workshops. 2020. pp. 696-697.

Choi, et al. "Accurate and efficient 2-bit quantized neural networks." *Proceedings of Machine Learning and Systems* 1 (2019): pp. 348-359.

Conti, et al. "XNOR neural engine: A hardware accelerator IP for 21.6-fJ/op binary neural network inference." *IEEE Transactions on Computer-Aided Design of Integrated Circuits and Systems* 37.11 (Jul. 9, 2018): pp. 2940-2951.

Umuroglu, et al. "Finn: A framework for fast, scalable binarized neural network inference." *Proceedings of the 2017 ACM/SIGDA international symposium on field-programmable gate arrays*. (Dec. 1, 2016): pp. 65-74.

* cited by examiner

QUANTIZATION METHOD OF NEURAL NETWORK AND APPARATUS FOR PERFORMING THE SAME

CROSS-REFERENCE TO RELATED APPLICATIONS

This application claims the benefit under 35 USC § 119(a) of Korean Patent Application No. 10-2021-0155942, filed on Nov. 12, 2021, in the Korean Intellectual Property Office, the entire disclosure of which is incorporated herein by reference for all purposes.

BACKGROUND

1. Field

The following disclosure relates to a quantization method of a neural network and an apparatus for performing the quantization.

2. Description of Related Art

Quantization helps to increase the power efficiency while reducing the amount of computational operation in the field of artificial intelligence. Quantization includes various technologies of converting input values expressed in accurate and fine units into values in more simplified units. Quantization technology is used to reduce the number of bits required to represent information.

In general, an artificial neural network includes an active node, a connection between nodes, and a weight parameter associated with each connection. Here, the weight parameter and the active node may be quantized. If a neural network is executed in hardware, multiplication and addition operations may be performed millions of times.

If a lower-bit mathematical operation is performed with quantized parameters and if an intermediate calculation value of the neural network is also quantized, both an operation speed and performance may increase. In addition, if the artificial neural network is quantized, a memory access may be reduced and an operation efficiency may be increased, thereby increasing power efficiency.

However, an accuracy of the artificial neural network may decrease due to quantization. Accordingly, quantization technology is being developed to increase the operation efficiency and the power efficiency, but does not have an influence on the accuracy.

In this regard, International Patent Publication No. WO2020248424, titled "Method for determining quantization parameters in neural network and related products" discloses a method of determining quantization parameters in an artificial neural network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a quantization method of a neural network, the method including obtaining parameters of the neural network, quantizing the parameters using a quantization scheme in which at least one positive quantization level and at least one negative quantization level symmetric to each other by excluding zero from quantization levels, and outputting the quantized parameters.

The quantizing of the parameters may include quantizing the parameters based on vbar=clip(round(v/s+0.5)–0.5, –2b–1+0.5, 2b–1–0.5), wherein v denotes the parameters, s denotes a step side for determining a quantization range of the neural network, and b denotes a number of quantization bits.

The method may include training the parameters through quantization-aware training.

A step size for determining a quantization range of the neural network may be determined based on joint training with the parameters.

A step size for determining a quantization range of the neural network may be determined based on the following equation $$\frac{\partial v}{\partial s} = \begin{cases} -\frac{v}{s} + \left(\left\lceil \frac{v}{s} \right\rceil - 0.5\right) \text{ if } -Q_n < \left(\left\lceil \frac{v}{s} \right\rceil - 0.5\right) \leq Q_p \\ Q_n \text{ if } \left(\left\lceil \frac{v}{s} \right\rceil - 0.5\right) \leq -Q_n \\ Q_p \text{ if } \left(\left\lceil \frac{v}{s} \right\rceil - 0.5\right) \geq Q_p \end{cases},$$

wherein v denotes the parameters, s denotes the step side, $-Q_n$ denotes a lowest quantization level, Qn denotes an absolute value of the lowest quantization level, and $Q_p$ denotes a highest quantization level.

A multiply-accumulate (MAC) operation based on the quantized parameters may be performed by binary neural network (BNN) hardware with an XNOR-Popcount structure.

The quantized parameters may be symmetric with respect to zero and equally assigned to a positive number and a negative number.

The method may include training the neural network trained with the quantized parameters.

The at least one positive quantization level and at least one negative quantization level may be completely symmetric to each other by excluding zero from the quantization levels.

In another general aspect, there is provided an apparatus for a quantization method of a neural network, the apparatus including a processor configured to obtain parameters of the neural network, quantize the parameters using a quantization scheme in which at least one positive quantization level and at least one negative quantization level symmetric to each other by excluding zero from quantization levels, and output the quantized parameters.

The processor may be configured to quantize the parameters based on the equation vbar=clip(round(v/s+0.5)–0.5, –2b–1+0.5, 2b–1–0.5), wherein v denotes the parameters, s denotes a step side for determining a quantization range of the neural network, and b denotes a number of quantization bits.

The processor may be configured to train the parameters through quantization-aware training.

A step size for determining a quantization range of the neural network may be determined based on joint training with the parameters.

A step size for determining a quantization range of the neural network may be determined based on the following equation $$\frac{\partial v}{\partial s} = \begin{cases} -\frac{v}{s} + \left(\left\lceil \frac{v}{s} \right\rceil - 0.5\right) \text{ if } -Q_n < \left(\left\lceil \frac{v}{s} \right\rceil - 0.5\right) \le Q_p \\ Q_n \text{ if } \left(\left\lceil \frac{v}{s} \right\rceil - 0.5\right) \le -Q_n \\ Q_p \text{ if } \left(\left\lceil \frac{v}{s} \right\rceil - 0.5\right) \ge Q_p \end{cases},$$

wherein v denotes the parameters, s denotes the step side, $-Q_n$ denotes a lowest quantization level, Qn denotes an absolute value of the lowest quantization level, and $Q_p$ denotes a highest quantization level.

A multiply-accumulate (MAC) operation based on the quantized parameters may be performed by binary neural network (BNN) hardware with an XNOR-Popcount structure.

The quantized parameters may be symmetric with respect to zero and may be equally assigned to a positive number and a negative number.

The apparatus may include a communicator configured to perform a wireless communication, and a memory configured to store at least one program, wherein the processor is configured to execute the at least one program.

Other features and aspects will be apparent from the following detailed description, the drawings, and the claims.

Figure 1:
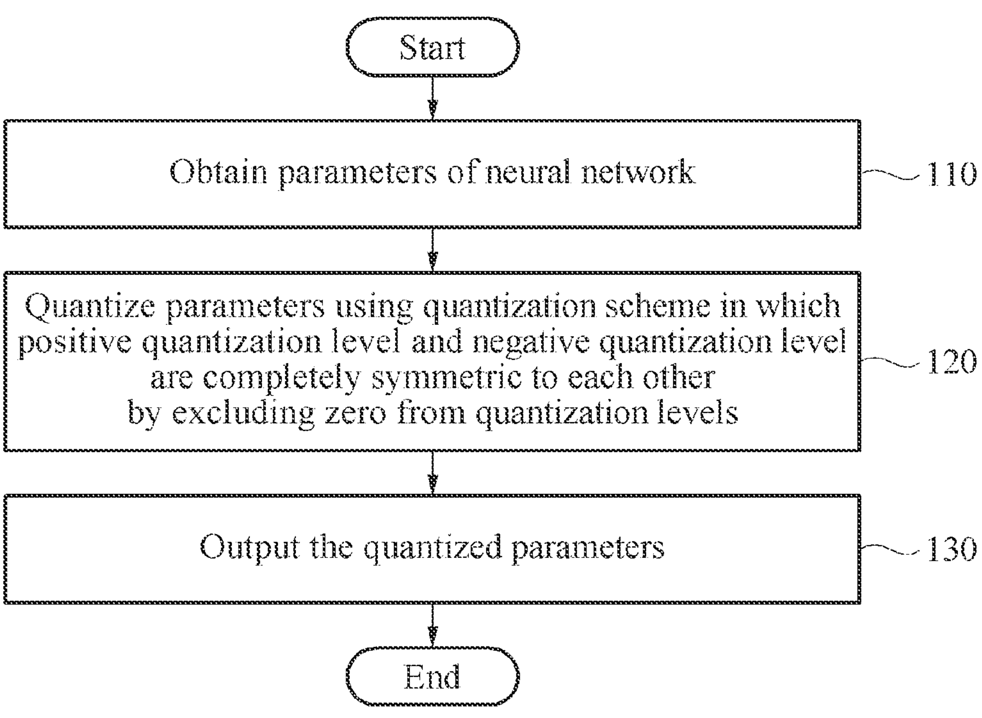
FIG. 1 is a diagram illustrating an example of a quantization method of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular example embodiments only and is not to be limiting of the example embodiments. The singular forms "e, "an", and "the" are intended to include the plural forms as well, unless the context clearly indicates otherwise. As used herein, the term "and/or" includes any one and any combination of any two or more of the associated listed items. It will be further understood that the terms "comprises/comprising," "have/having," and/or "includes/including" when used herein, specify the presence of stated features, integers, steps, operations, elements, and/or components, but do not preclude the presence or addition of one or more other features, integers, steps, operations, elements, components and/or groups thereof.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Although terms such as "first," "second," and "third", A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements. In contrast, when an element is described as being "directly connected to," or "directly coupled to" another element, there can be no other elements intervening therebetween.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

To quantize weight parameters of a neural network, a symmetric quantizer that is generally mapped to $[-2^{(b-1)}, 2^{(b-1)-1}]$ may be used. Here, b denotes a number of quantization bits. Performance of a quantized neural network (QNN) may be reduced when quantization with a low precision within 3 bits is performed. In a general quantization scheme, positive and negative quantization levels may be unequally assigned (e.g., −1, 0, 1, 2, etc.), which may lead to an occurrence of an error and a reduction in performance at a low-precision quantization level due to an asymmetry of positive and negative numbers.

The neural network or an artificial neural network (ANN) may generate mapping between input patterns and output patterns, and may have a generalization capability to generate a relatively correct output with respect to an input pattern that has not been used for training. The neural network may refer to a general model that has an ability to solve a problem, where nodes form the network through synaptic combinations change a connection strength of synapses through training.

The neural network may be implemented as an architecture having a plurality of layers including an input image, feature maps, and an output. In the neural network, the input image may be convoluted with a filter called weights, and as a result, a plurality of feature maps may be output. The output feature maps may be again convoluted as input feature maps with the weights, and a plurality of new feature maps may be output. After the convolution operations are repeatedly performed, the recognition results of features of the input image through the neural network may be finally output.

In an example, training an artificial neural network may indicate determining and updating weights and biases between layers or weights and biases among a plurality of nodes belonging to different layers adjacent to one another. In an example, weights and biases of a plurality of layered structures, a plurality of layers, or nodes may be collectively referred to as connectivity of an artificial neural network. Therefore, training an artificial neural network may indicate construction and training of the connectivity.

To implement a neural network, a model including nodes and a connection network of the nodes may be realized through a multiplication in an activation function and a large number of multiply-accumulate (MAC) operations of summing multiplication values of weights and transmitting the sum to a single neuron in inference and training. A size of MAC operations may be determined in proportion to a size of the neural network, and output data and data of an operand required for MAC may be stored in a memory in which the neural network is implemented.

In the neural network, a MAC operator and a memory may be in the form of hardware. In an example, such MAC operations and memory mapped to hardware and implemented in parallel may be regarded as a hardware-type implementation of the neural network, however, an efficiency of a multiplier and an adder used in a MAC operation may be increased or an amount of memory used may be reduced.

A binary neural network (BNN) may be provided as a scheme to increase a memory and computation costs of a deep neural network. The BNN may quantize a value of a weight and a value of an activation tensor to +1 and −1, respectively, and express the values by 1 bit, but a prediction accuracy may be relatively low.

Hardware of the BNN may implement a multiplication through an XNOR operation, which is a logical operation, and implement a cumulative addition through a popcount instruction to know a number of bits set to "1" in a register. The BNN may improve an operation speed, because there is no need for multiplication and an addition between real numbers or integers. In addition, since the number of bits is reduced from an existing 32 bits to 1 bit, a memory bandwidth may theoretically increase by 32 times.

The BNN may perform an XNOR operation after converting both an input and a weight into 1 bit. A loss caused by conversion from 32 bits to 1 bit may be compensated for by multiplying an XNOR operation result by an approximate value.

Examples described herein may provide a quantization method that may implement efficient hardware for a deep neural network using a bit operation in BNN hardware.

FIG. 1 illustrates an example of a quantization method of a neural network. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer, such as a processor, that perform the specified functions, or combinations of special purpose hardware and computer instructions.

In operation 110, an apparatus may obtain parameters of the neural network.

In the quantization method, a uniform range between parameters, and a symmetric structure between a positive number and a negative number may be provided, and zero may not be included as a quantization level. In other words, zero may be excluded from quantization levels, and positive quantization levels and negative quantization levels may be completely symmetric to each other. For example, a step size for a quantization range may be determined as "2" to perform quantization to a fraction such as {−1.5, −0.5, 0.5, 1.5} and quantization to an integer such as {−3, −1, 1, 3}.

A parameter level of conventional linear quantization (CLQ) may be expressed as [−2^(b−1), 2^(b−1)−1] according to a number of bits. For example, 2 bits may be expressed as {−2, −1, 0, 1}. An asymmetry between positive numbers and negative numbers may be inversely determined.

In reduced symmetric quantization (RSQ), quantization may be performed to levels "L=−2b−1+1" and "U=2b−1−1", for example, {−1, 0, 1}, using one less quantization parameter in comparison to a level of an example, and a complete symmetry with respect to zero may be realized. In the RSQ, a number of quantization levels may decrease, which may result in a decrease in performance.

In extended symmetric quantization (ESQ), one or more quantization levels may be used to realize a symmetry with respect to zero, and 2 bits or greater may be requested. Quantization may be performed to levels "L=−2b−1" and "U=2b−1", for example, {−2, −1, 0, 1, 2}.

Non-uniform symmetric quantization (NSQ) may include a symmetric form in which 2b quantization levels do not include zero. For example, a method of performing quantization to {−2, −1, 1, 2} may be provided, but ranges between quantization levels may not be the same.

In operation 120, the apparatus may quantize the parameters using a quantization scheme in which at least one positive quantization level and at least one negative quantization level are completely symmetric to each other by excluding zero from quantization levels.

In an example, the neural network may be trained together with a parameter and a quantization range of the parameter. Various training schemes developed for linear quantization may be applied without deviating from the spirit or the scope of the illustrative examples described. Quantization-aware training may be applied for training on quantized parameters. For example, a quantization range may be trained in the same manner as learned step size quantization (LSQ).

In an example, to train on such symmetric quantization parameters, a differentiation formula such as Equation 1 below may be used.

$$\frac{\partial v}{\partial s} = \begin{cases} -\frac{v}{s} + \left(\left\lceil \frac{v}{s} \right\rceil - 0.5\right) \text{ if } -Q_n < \left(\left\lceil \frac{v}{s} \right\rceil - 0.5\right) \le Q_p \\ Q_n \text{ if } \left(\left\lceil \frac{v}{s} \right\rceil - 0.5\right) \le -Q_n \\ Q_p \text{ if } \left(\left\lceil \frac{v}{s} \right\rceil - 0.5\right) \ge Q_p \end{cases}, \quad \text{[Equation 1]}$$

To optimize a step size s of a quantization range using a gradient descent scheme, the differentiation formula such as Equation 1 above may be used. In Equation 1, v denotes an input value, Qn denotes an absolute value of a minimum value of a quantization range, and Qp denotes a maximum value of the quantization range.

The gradient descent scheme may be used to reduce a loss function through a change in a gradient of a real function, and may include a process of reducing an error by obtaining a gradient for an initial point in time and converging the gradient through a process of movement in an opposite direction of the gradient. In an example, a converged loss gradient may be calculated. A gradient of a step size may be scaled to $g=1/\sqrt{N_W 2^p}$, similar to a scaling of a gradient. Here, g denotes scaling of a step size, $N_w$ denotes a number of quantization parameters, and p denotes a bit-width.

In an example, a weight may be initialized to $2\langle |v| \rangle/\sqrt{Q}$. Here, <•> may be used as a scheme of indicating a mean of a distribution.

In an example, a quantization scheme obtained through training may be expressed as shown in Equation 2 below.

$$\dot{v} = \left\lfloor \frac{v}{s} + 0.5 \right\rceil - 0.5 \quad \text{[Equation 2]}$$

$$\bar{v} = \text{clip}(\dot{v}, -Q, Q)$$

$$\hat{v} = \bar{v} \times s$$

In Equation 2, a clip( ) function may be represented as clip (list, minimum value, maximum value) and may return an array in which values in a list are converted into values between a minimum value and a maximum value, and clip (x; a; b)=min (max (x; a); b) may be expressed.

Here, v denotes an arbitrary input value, and s denotes the step size. Through the above training, $=2^{b-1}-0.5$" in which b denotes a quantization density, that is, a predetermined number of bits, may be determined. In addition, although v is not an integer, v may be more accurately expressed through a b-bit quantization method according to an example. In addition, denotes a value calculated in b-bit hardware, and corresponds to a reduced version of $\bar{v}$ defined and used for training. A quantization apparatus according to an example described herein may be equally expressed for a positive number and a negative number of an input distribution.

In operation 130, the apparatus may output the quantized parameters.

In an example, the quantized parameters may have a structure in which positive quantization levels and negative quantization levels are symmetric to each other by excluding zero from quantization levels, as described above.

Figure 2A:
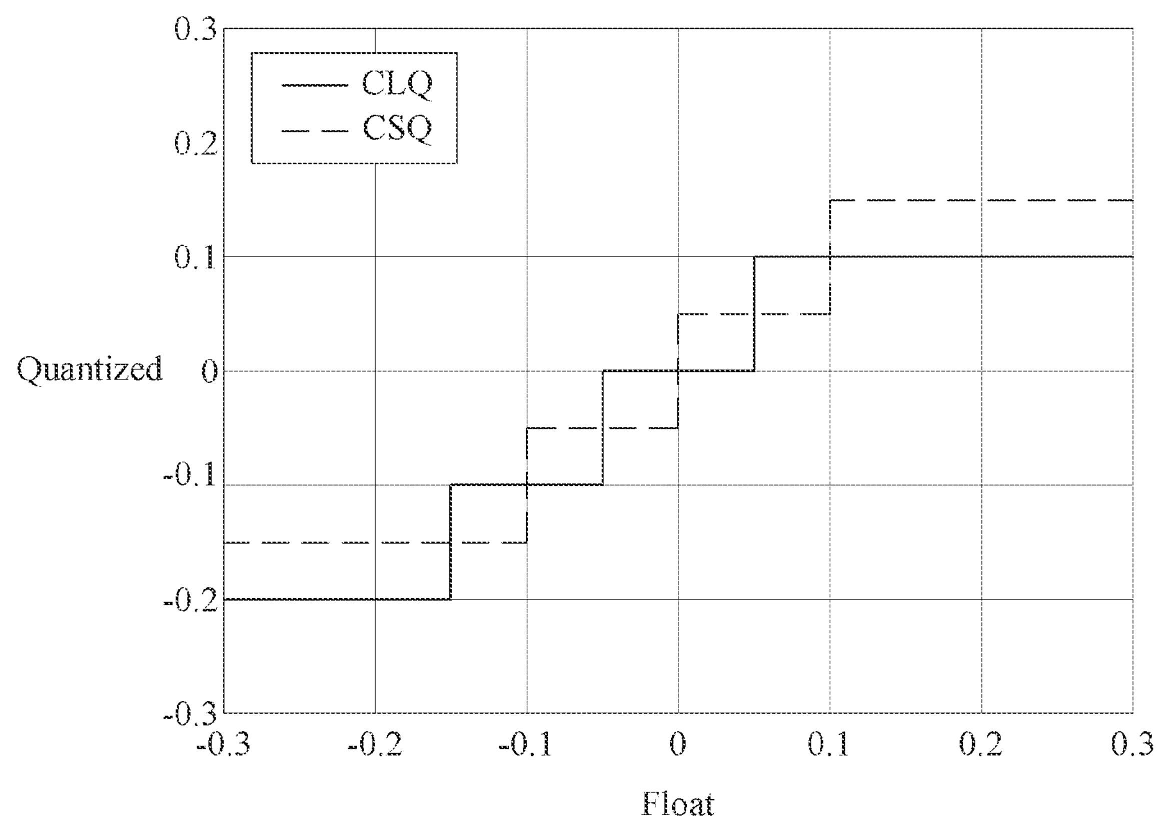
FIGS. 2A and 2B are graphs illustrating examples of quantization parameters.
Figure 2B:
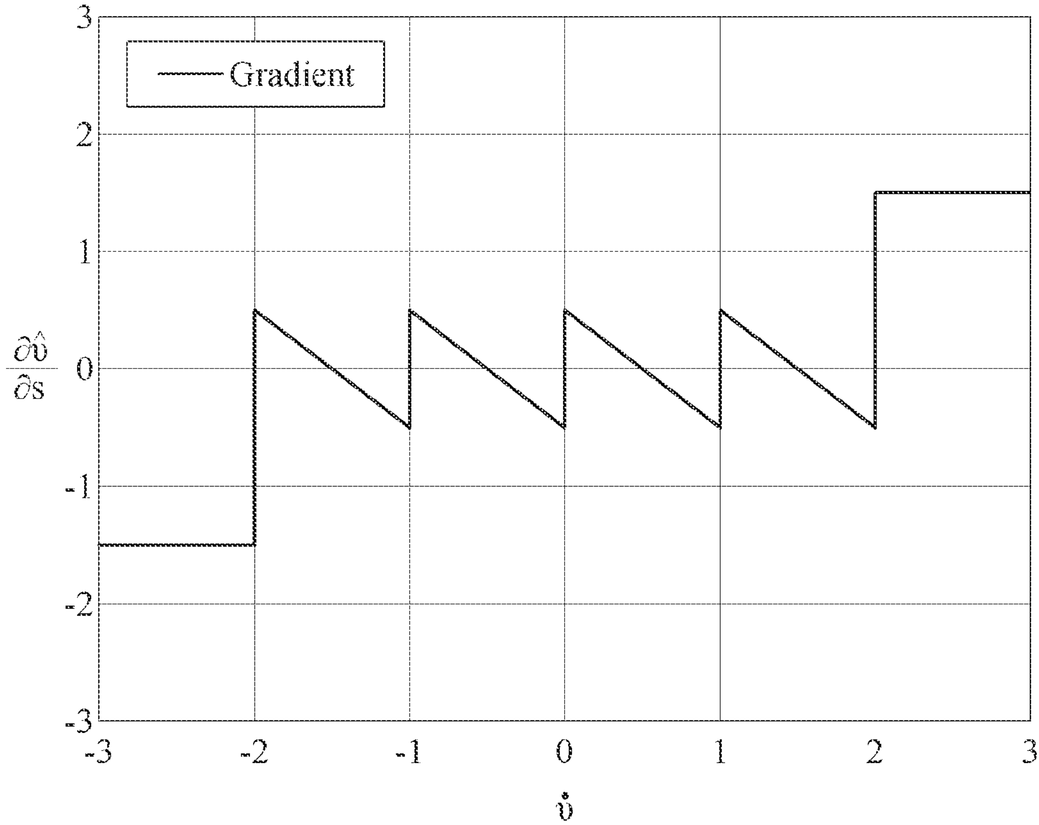

FIGS. 2A and 2B are graphs illustrating examples of quantization parameters.

FIG. 2A illustrates results according to a general linear quantization method and a quantization method, and FIG. 2B is a graph showing a gradient for a step size of a quantization parameter.

A graph of FIG. 2A shows an example in which 2-bit encoded data is quantized. As shown in FIG. 2A, results of quantizing values around zero for the linear quantization method having the same step size may be different from each other, and quantization may be possible in a form in which upper and lower ranges are equal with respect to zero in the quantization method. A rounding operator may be applied to all input values, except portions in which an input is an integer.

The graph according to the example is shown based on a quantization range determined by a step size optimized through the gradient descent scheme described above with reference to FIG. 1. As shown in FIG. 2B, it can be found that a quantization result may be obtained within a predetermined gradient with respect to an input value included in a quantization range by the quantization method according to the example described herein.

The hardware-based quantization method may use software running on the hardware to have an efficiency close to maximum entropy in a low-bit quantized weight, for example, 3 bits or less.

A typical example may be a BNN. Although the BNN is an innovative scheme in that a speed of an existing neural network may significantly increase and a memory needed for a neural network model may be significantly reduced, a loss of information may occur because existing floating-point weights and activation functions are expressed as "−1" and "1". The above information loss may lead to a decrease in an accuracy, thereby reducing performance when an object is recognized or detected.

For example, when "1.4" and "0.2", which both are positive numbers, are mapped to "1", for example, when the above two values different by seven times are mapped to the same value, a quantization error may become extremely large. Thus, binary quantization may be performed based on a magnitude of data using a scale factor in a binary neural network according to a related art. However, the scale factor may also need to be determined through training.

The quantization method may be efficiently mapped to BNN hardware. Binary weights, for example, weight parameters of "+1" and "−1" may be applied through the BNN. The above weight parameters may be applied to eliminate a multiplier when implemented in hardware, and a high operation speed may be provided by simplifying a neural network structure.

In an example, if binary encoding is performed in a BNN, "0" may be interpreted as "−1", instead of a general 2' complement scheme. For example, 010 may be encoded to −1, 1, −1, and a corresponding input may be expressed as −(2^2)±(2^1)−(2^0)=−3.

The BNN may implement a MAC operation using XNOR-popcount. Using the above hardware implementation, it may be easy to remove an additional bit for sign extension.

Hereinafter, an example of performing an XNOR-popcount operation on 2-bit encoded data will be described.

A 2-bit binary number x=x1 x0 may represent an integer and may be expressed as X=2*(−1)^x1+(−1)^x0. A 2-bit binary number y=y1 y0 may represent an integer and may be expressed as Y=2*(−1)^y1+(−1)^y0.

A product of X and Y may be represented by XY=4*(−1)^(x1+y1)+2*(−1)^(x0+y1)+2*(−1)^(x1+y0)+(−1)^(x0+y0).

In an example of a 1-bit binary number x, y, z=xnor(x, y), Z=(−1)^z, X=(−1)^x, and Y=(−1)^y, and accordingly XY=−Z may be represented. If a corresponding equation is calculated, $XY=(-1)^{(x+y)}=(-1)^{xor(x, y)}=(-1)^{[1+xnor(x, y)]}=-1*(-1)^{xnor(x, y)}=-Z$ may be obtained.

In addition, in quantization encoding according to an example, $Z=2*z-1$, and as a result, $XY=1-2z=1-2\,xnor(x, y)$.

Accordingly, XY may be expressed again using XNOR-popcount as shown below.

$$XY=4*(1-2xnor(x1,y1))+2*(1-2xnor(x0,y1))+2*(1-2xnor(x1,y0))+(1-2xnor(x0,y0))=9-8xnor(x1,y1)-4(xnor(x0,y1)+xnor(x1,y0))-2xnor(x0,y0)$$

Thus, a XY product may be calculated using four XNOR operations, three shift operations (2 bits), and four addition operations. Further simplification may be achieved by combining a constant term with a bias term and dividing all terms by "2". In this example, only four XNOR operations, two shift operations, and three addition operations may be required.

For reference, alternatively, 2's complement encoding may be used. In this example, a multiplier with a more complex sign may be used to efficiently calculate XY.

In another example, an offset binary with excess-2 may be used as follows. $X'=X+2\geq 0$ and $Y'=Y+2\geq 0$ may be satisfied, and X and Y may be interpreted as general 2's complement for x and y. Accordingly, X' and Y' may be unsigned versions (2-excess code).

Accordingly, the XY product may be calculated as $XY=(X'-2)(Y'-2)=X'Y'-2(X'+Y')+4$. A corresponding equation may require a 2-bit multiplication, one shift (3 bits), and three additions. In an example of an unsigned 2-bit multiplication, four AND operations and three shift operations may be additionally required.

Thus, quantization encoding may be more efficient for a 2-bit multiplication. During quantization, 2-bit×2-bit multiplication and 1-bit×2-bit multiplication may be performed in XNOR-popcount BNN hardware even though additional hardware (e.g., a signed or unsigned multiplier) is not added.

Figure 3:
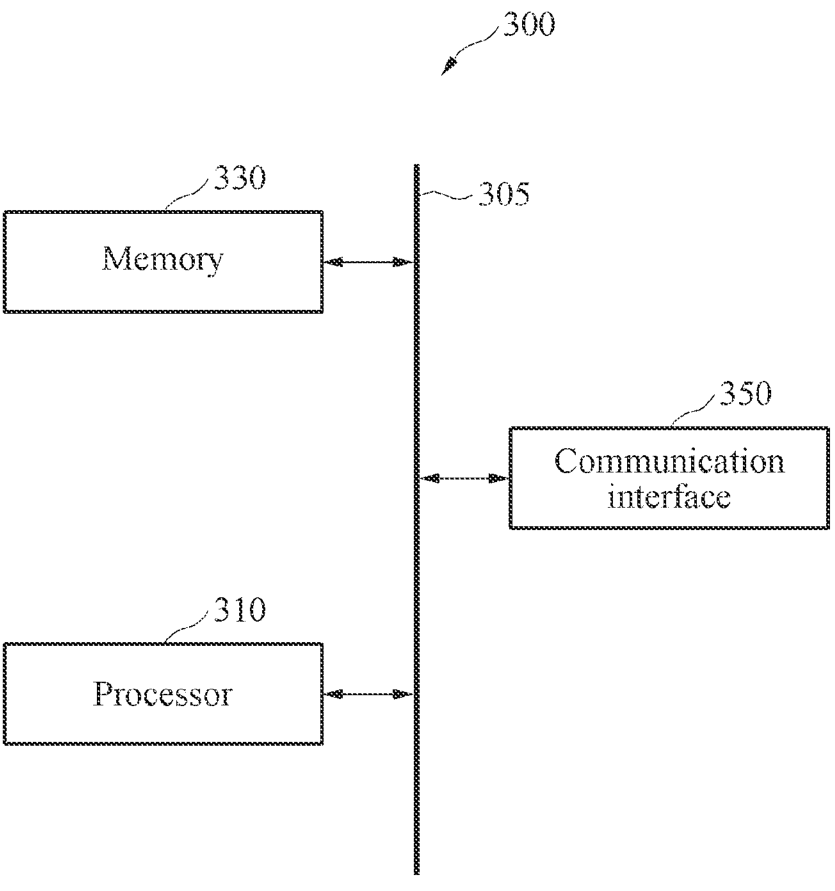
FIG. 3 is a diagram illustrating an example of an apparatus for quantization.

FIG. 3 is a diagram illustrating an example of an apparatus for quantization.

Referring to FIG. 3, an apparatus 300 for quantization may include a processor 310, a memory 330, and a communication interface 350. The processor 310, the memory 330, and the communication interface 350 may communicate with each other via a communication bus 305.

The processor 310 may be a data processing device implemented by hardware including a circuit having a physical structure to perform desired operations. For example, the desired operations may include code or instructions included in a program.

The hardware-implemented data processing device may include, for example, a main processor (e.g., a central processing unit (CPU), a field-programmable gate array (FPGA), or an application processor (AP)) or an auxiliary processor (e.g., a GPU, a neural processing unit (NPU), an image signal processor (ISP), a sensor hub processor, or a communication processor (CP)) that is operable independently of, or in conjunction with the main processor. Further details regarding the processor 310 is provided below.

The processor 310 may perform a quantization method of a neural network. The quantization method may include obtaining parameters of the neural network, quantizing the parameters using a quantization scheme in which at least one positive quantization level and at least one negative quantization level are completely symmetric to each other by excluding zero from quantization levels, and outputting the quantized parameters.

In the quantization method, a uniform range between parameters, and a symmetric structure between a positive number and a negative number may be provided, and zero may not be included as a quantization level. In an example, training may be performed such that zero may be excluded from the quantization levels, that positive and negative quantization levels may be completely symmetric to each other with respect to zero, and that the quantization levels may be equally distributed to positive and negative numbers, respectively.

In an example, the neural network may be trained together with a parameter and a quantization range of the parameter. Various training schemes developed for linear quantization may be applied to a training scheme according to examples. Quantization-aware training may be applied for training on quantized parameters.

The apparatus 300 may be implemented with hardware and software with an efficiency close to maximum entropy in a low-bit quantized weight, for example, 3 bits or less, through BNN hardware with an XNOR-popcount structure.

The memory 330 may be, for example, a volatile memory or a non-volatile memory. The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 220 is provided below.

The processor 310 may execute a program and control the apparatus 300. A code of the program executed by the processor 310 may be stored in the memory 330. The apparatus 300 may be connected to an external device (e.g., a personal computer (PC) or a network) through an input/output device (not shown) to exchange data therewith.

The apparatus 300 may be may be implemented as a various types of computing devices, such as, for example, a personal computer (PC), a data server, or a portable device. In an example, the portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a television (TV), a wearable device, a security system, a smart home system, a handheld game console, an e-book, a smart vehicle, an autonomous vehicle, or a smart device. In an example, the apparatus 300 may be a wearable device, such as, for example, an apparatus for providing augmented reality (AR) (hereinafter simply referred to as an "AR provision device") such as AR glasses, a head mounted display (HMD), a smart watch, and a product inspection device.

Figure 4A:
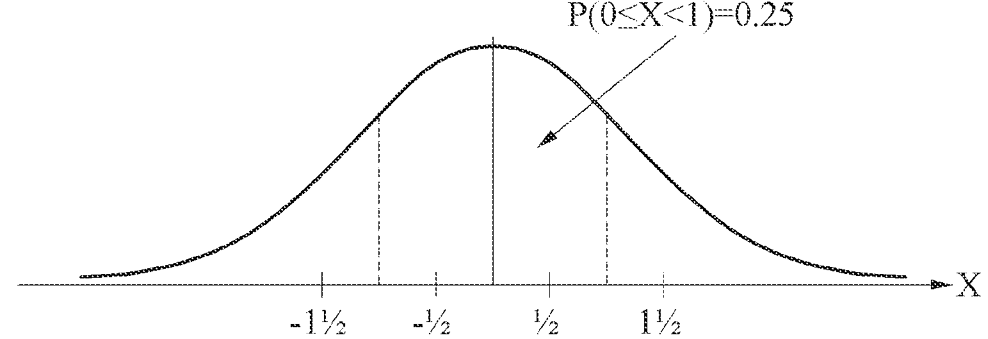
FIG. 4A is a graph illustrating a normal distribution of ranges according to quantization levels.
Figure 4B:
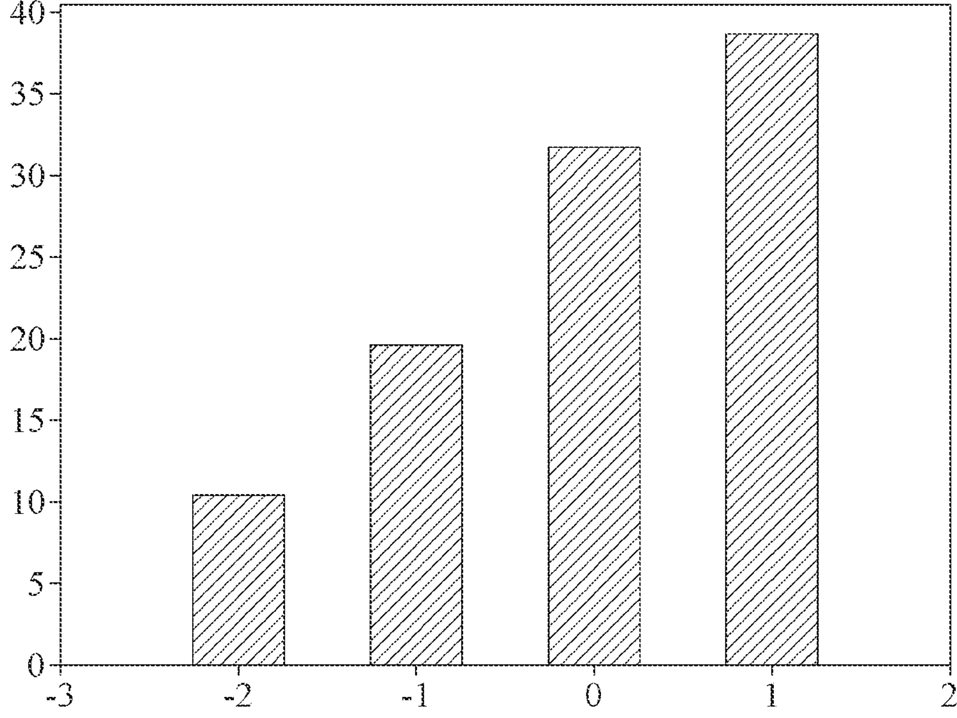
FIGS. 4B and 4C are graphs illustrating a probability of actual data being mapped to conventional linear quantization (CLQ) and a probability of actual data being mapped to a quantization method according to an example, respectively.
Figure 4C:
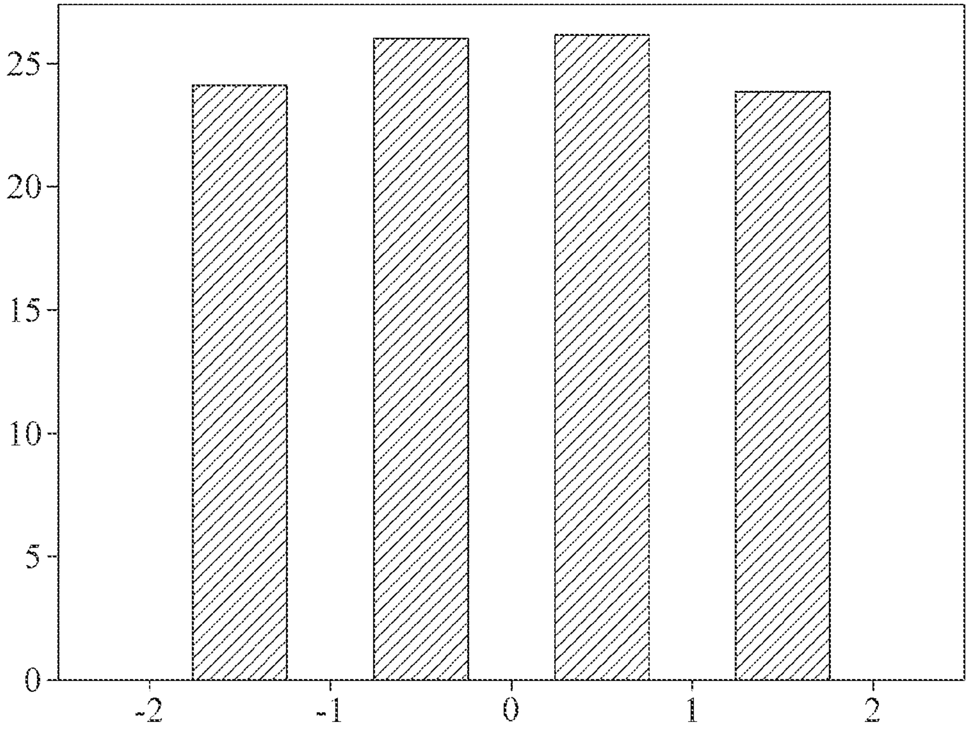

FIGS. 4A through 4C illustrate an example of a probability distribution of a quantization range quantized to 2 bits.

FIG. 4A is a graph illustrating an example of a normal distribution of ranges according to quantization levels.

In FIG. 4A, an x-axis represents a quantization level, and a y-axis represents a probability distribution for each actual data. In an example, the normal distribution may be similar to a Gaussian distribution.

A quantization method according to an example may be used to maximize an efficiency according to a quantization level through quantization.

In an example in which data is quantized, when data mapped for each quantization level needs to be distributed as uniformly as possible, a high quantization efficiency may be provided, or when a distribution of quantization levels is similar to a data distribution, for example, a Gaussian distribution, a high quantization efficiency may be provided.

The quantization method according to the examples described above may satisfy both the above two conditions. For example, if quantization is performed to 2 bits according to an example, in general, the above two conditions may be satisfied based on a threshold $\{-1; 0; 1\}$.

In an example, data may be uniformly distributed over the quantization levels as shown in FIG. 4A, and at the same time, the quantization levels may also follow the Gaussian distribution. In this example, it may be assumed that the Gaussian distribution of FIG. 4A follows a cumulative distribution function (CDF) of a standard normal distribution represented by $P(0 \leq X \leq s)=0{:}25$ in $X \sim N(0; 1)$.

FIGS. 4B and 4C are graphs illustrating a probability of actual data being mapped by CLQ and a probability of actual data being mapped by a quantization method according to an example, respectively.

FIG. 4B illustrates a mapping probability of actual data being mapped to a quantization level trained and determined by CLQ, and FIG. 4C illustrates a mapping probability of actual data being mapped to a quantization level trained and determined by the quantization method according to the examples described above.

As shown in FIG. 4B, quantization levels may correspond to (−2, −1, 0, 1), and mapping probabilities for each quantization level may range from 10% to 40%, and thus it may be difficult to evaluate a quantization efficiency to be good. However, in FIG. 4C, mapping probabilities may appear relatively uniform around 25% for each of quantization levels −1.5, −0.5, 0.5, and 1.5.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method for quantization method of a neural network. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A quantization method of a neural network, the method comprising:

obtaining parameters of the neural network;

quantizing the parameters using a quantization scheme in which at least one positive quantization level and at least one negative quantization level are symmetric to each other by excluding zero from quantization levels; and outputting the quantized parameters, wherein the quantizing further comprises:

normalizing the parameters based on a step size for determining a quantization interval of the neural network;

generating an intermediate value based on the normalized parameters; and performing quantization by applying a clip function to the intermediate value, a minimum value and a maximum value of a quantization range determined by a number of quantization bits.

2. The method of claim 1, wherein the quantizing of the parameters comprises quantizing the parameters based on vbar=clip(round(v/s+0.5)–0.5, –2b–1+0.5, 2b–1–0.5), wherein v denotes the parameters, s denotes a step side-step size for determining a quantization range of the neural network, and b denotes a number of quantization bits.

3. The method of claim 1, further comprising training the parameters through quantization-aware training.

4. The method of claim 1, wherein a step size for determining a quantization range of the neural network is determined based on joint training with the parameters.

5. The method of claim 1, wherein a step size for determining a quantization range of the neural network is determined based on the following equation:

$$\frac{\partial v}{\partial s} = \begin{cases} -\frac{v}{s} + \left(\left\lceil \frac{v}{s} \right\rceil - 0.5\right) \text{ if } -Q_n < \left(\left\lceil \frac{v}{s} \right\rceil - 0.5\right) \le Q_p \\ Q_n \text{ if } \left(\left\lceil \frac{v}{s} \right\rceil - 0.5\right) \le -Q_n \\ Q_p \text{ if } \left(\left\lceil \frac{v}{s} \right\rceil - 0.5\right) \ge Q_p \end{cases},$$

wherein v denotes the parameters, s denotes the step side, –Qn denotes a lowest quantization level, Qn denotes an absolute value of the lowest quantization level, and Qp denotes a highest quantization level.

6. The method of claim 1, wherein a multiply-accumulate (MAC) operation based on the quantized parameters is performed by binary neural network (BNN) hardware with an XNOR-Popcount structure.

7. The method of claim 1, wherein the quantized parameters are symmetric with respect to zero and equally assigned to a positive number and a negative number.

8. The method of claim 1, further comprising training the neural network trained with the quantized parameters.

9. A non-transitory computer-readable storage medium storing instructions that, when executed by a processor, cause the processor to perform the quantization method of claim 1.

10. An apparatus for a quantization method of a neural network, the apparatus comprising:

a processor configured to:

obtain parameters of the neural network;

quantize the parameters using a quantization scheme in which at least one positive quantization level and at least one negative quantization level are symmetric to each other by excluding zero from quantization levels; and output the quantized parameters, wherein the processor quantizes the parameters by:

normalizing the parameters based on a step size for determining a quantization interval of the neural network;

generating an intermediate value based on the normalized parameters; and performing quantization by applying a clip function to the intermediate value, a minimum value and a maximum value of a quantization range determined by a number of quantization bits.

11. The apparatus of claim 10, wherein the processor is further configured to quantize the parameters based on the following equation:

$$vbar=clip(round(v/s+0.5)-0.5,\ -2b-1+0.5,\ 2b-1-0.5),$$

wherein v denotes the parameters, s denotes a step size for determining a quantization range of the neural network, and b denotes a number of quantization bits.

12. The apparatus of claim 10, wherein the processor is further configured to train the parameters through quantization-aware training.

13. The apparatus of claim 10, wherein a step size for determining a quantization range of the neural network is determined based on joint training with the parameters.

14. The apparatus of claim 10, wherein a step size for determining a quantization range of the neural network is determined based on the following equation:

$$\frac{\partial v}{\partial s} = \begin{cases} -\frac{v}{s} + \left(\left\lceil \frac{v}{s} \right\rceil - 0.5\right) \text{ if } -Q_n < \left(\left\lceil \frac{v}{s} \right\rceil - 0.5\right) \le Q_p \\ Q_n \text{ if } \left(\left\lceil \frac{v}{s} \right\rceil - 0.5\right) \le -Q_n \\ Q_p \text{ if } \left(\left\lceil \frac{v}{s} \right\rceil - 0.5\right) \ge Q_p \end{cases},$$

wherein v denotes the parameters, s denotes the step side, −Qn denotes a lowest quantization level, Qn denotes an absolute value of the lowest quantization level, and Qp denotes a highest quantization level.

15. The apparatus of claim 10, wherein a multiply-accumulate (MAC) operation based on the quantized parameters is performed by binary neural network (BNN) hardware with an XNOR-Popcount structure.

16. The apparatus of claim 10, wherein the quantized parameters are symmetric with respect to zero and equally assigned to a positive number and a negative number.

17. The apparatus of claim 10, further comprising a communicator configured to perform a wireless communication; and a memory configured to store at least one program, wherein the processor is configured to execute the at least one program.

18. A processor-implemented method, the method comprising:

receiving input data for a neural network task;

obtaining parameters of a neural network performing the neural network task;

quantizing the parameters using a quantization scheme in which at least one positive quantization level and at least one negative quantization level are symmetric to each other by excluding zero from quantization levels;

outputting the quantized parameters; and performing the task on the input data using the neural network with the quantized parameters to generate a task result, wherein the quantizing further comprises:

excluding zero from the quantization levels so that at least one positive quantization level and at least one negative quantization level are completely symmetric to each other, wherein the quantizing comprises:

normalizing the parameters based on a step size for determining a quantization interval of the neural network;

generating an intermediate value based on the normalized parameters; and performing quantization by applying a clip function to the intermediate value, a minimum value and a maximum value of a quantization range determined by a number of quantization bits.

19. The method of claim 18, wherein the quantizing further comprises:

distributing the quantization levels equally to positive and negative numbers, respectively, with a uniform range between parameters.

* * * * *